US011809017B2

(12) United States Patent
Maruyama (10) Patent No.: US 11,809,017 B2
(45) Date of Patent: Nov. 7, 2023

(54) FOCUS CONTROL DEVICE, LENS APPARATUS, IMAGING APPARATUS, AND CONTROL METHOD

(71) Applicant: CANON KABUSHIKI KAISHA, Tokyo (JP)

(72) Inventor: Satoshi Maruyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 294 days.

(21) Appl. No.: 17/071,799

(22) Filed: Oct. 15, 2020

(65) Prior Publication Data
US 2021/0124147 A1 Apr. 29, 2021

(30) Foreign Application Priority Data
Oct. 23, 2019 (JP) .................................. 2019-192822

(51) Int. Cl.
*G02B 7/28* (2021.01)
*G02B 7/08* (2021.01)
*G03B 3/10* (2021.01)

(52) U.S. Cl.
CPC ............... *G02B 7/282* (2013.01); *G02B 7/08* (2013.01); *G03B 3/10* (2013.01)

(58) Field of Classification Search
CPC .......... G02B 7/08; G02B 7/102; G02B 7/282; G03B 13/36; G03B 2205/0053; G03B 3/10; Y02E 60/10; Y02P 70/50
See application file for complete search history.

(56) References Cited

U.S. PATENT DOCUMENTS

2012/0120303 A1* 5/2012 Yamanaka ........... H04N 5/2253
348/347
2013/0010373 A1* 1/2013 Abe ......................... G02B 7/38
359/698
2016/0147040 A1 5/2016 Watanabe

* cited by examiner

*Primary Examiner* — Joseph P Martinez
*Assistant Examiner* — Vipin Patel
(74) *Attorney, Agent, or Firm* — CANON U.S.A., INC. IP Division (57) ABSTRACT

A lens control unit as a control device includes a second position profile generator that generates a second target position profile indicating a target position of a second focus lens unit of a lens apparatus in driving the second focus lens unit. A trajectory shift amount calculator of the lens control unit calculates a shift between an ideal position of the second focus lens unit corresponding to a position of the first focus lens unit and a position of the second focus lens unit in the second target position profile. A correction value calculator corrects the target position of the second focus lens unit based on this shift.

17 Claims, 11 Drawing Sheets

FOCUS CONTROL DEVICE, LENS APPARATUS, IMAGING APPARATUS, AND CONTROL METHOD

BACKGROUND OF THE DISCLOSURE

Field of the Disclosure

The aspect of the embodiments relates to a control method for a lens apparatus including a plurality of lens units that moves in different trajectories.

Description of the Related Art

Among lenses attachable to an imaging apparatus, there is a lens including two or more focus lens units that move in focusing. For example, focus is adjusted mainly by one focus lens unit, and an aberration fluctuation that accompanies focusing is corrected by another focus lens unit, so that an effect of reducing the shortest image capturing distance can be obtained.

US2016/0147040 discusses a method of calculating a target position of each of two focus lens units when a zoom lens for zooming is moved. In the method discussed in US2016/0147040, the target position is calculated based on position characteristic data that represents a relationship between positions, focal lengths, and object distances of a plurality of focus lens units, so that a lens unit different from the focus lens units that mainly perform focusing is prevented from moving too abruptly.

SUMMARY OF THE DISCLOSURE

According to an aspect of the embodiments, a control device that controls a lens apparatus including a first focus lens unit and a second focus lens unit that move in trajectories different from each other in focusing includes a generation unit configured to generate a second target position profile indicating a target position of the second focus lens unit in driving the second focus lens unit, an acquisition unit configured to acquire relationship information indicating relationships between respective positions of the first focus lens unit and the second focus lens unit and an object distance, a calculation unit configured to calculate a shift between an ideal position of the second focus lens unit and the position of the second focus lens unit in the second target position profile, the ideal position being calculated using the relationship information and corresponding to the position of the first focus lens unit, a correction unit configured to correct the target position of the second focus lens unit based on the shift, and a control unit configured to control the position of the second focus lens unit depending on the target position corrected by the correction unit.

According to another aspect of the embodiments, a lens apparatus includes a first focus lens unit, a second focus lens unit, and a controller, wherein the controller includes a generation unit configured to generate a second target position profile indicating a target position of the second focus lens unit in driving the second focus lens unit, an acquisition unit configured to acquire relationship information indicating relationships between respective positions of the first focus lens unit and the second focus lens unit and an object distance, a calculation unit configured to calculate a shift between an ideal position of the second focus lens unit and the position of the second focus lens unit in the second target position profile, the ideal position being calculated using the relationship information and corresponding to the position of the first focus lens unit, a correction unit configured to correct the target position of the second focus lens unit based on the shift, and a control unit configured to control the position of the second focus lens unit depending on the target position corrected by the correction unit.

According to yet another aspect of the embodiments, an imaging apparatus includes an image sensor, and a controller that controls an optical system including a first focus lens unit and a second focus lens unit that move in trajectories different from each other in focusing, wherein the controller includes a generation unit configured to generate a second target position profile indicating a target position of the second focus lens unit in driving the second focus lens unit, an acquisition unit configured to acquire relationship information indicating relationships between respective positions of the first focus lens unit and the second focus lens unit and an object distance, a calculation unit configured to calculate a shift between an ideal position of the second focus lens unit and the position of the second focus lens unit in the second target position profile, the ideal position being calculated using the relationship information and corresponding to the position of the first focus lens unit, a correction unit configured to correct the target position of the second focus lens unit based on the shift, and a control unit configured to control the position of the second focus lens unit depending on the target position corrected by the correction unit.

Further features of the disclosure will become apparent from the following description of exemplary embodiments with reference to the attached drawings.

DESCRIPTION OF THE EMBODIMENTS

Embodiments of the disclosure will be described below with reference to the attached drawings, using a lens interchangeable camera (a camera system). The lens interchangeable camera includes an interchangeable lens (a lens apparatus) having a control device, and a camera main body (an imaging apparatus). The same components in the drawings are provided with the same reference numerals, and the description thereof will not be repeated.

Figure 1:
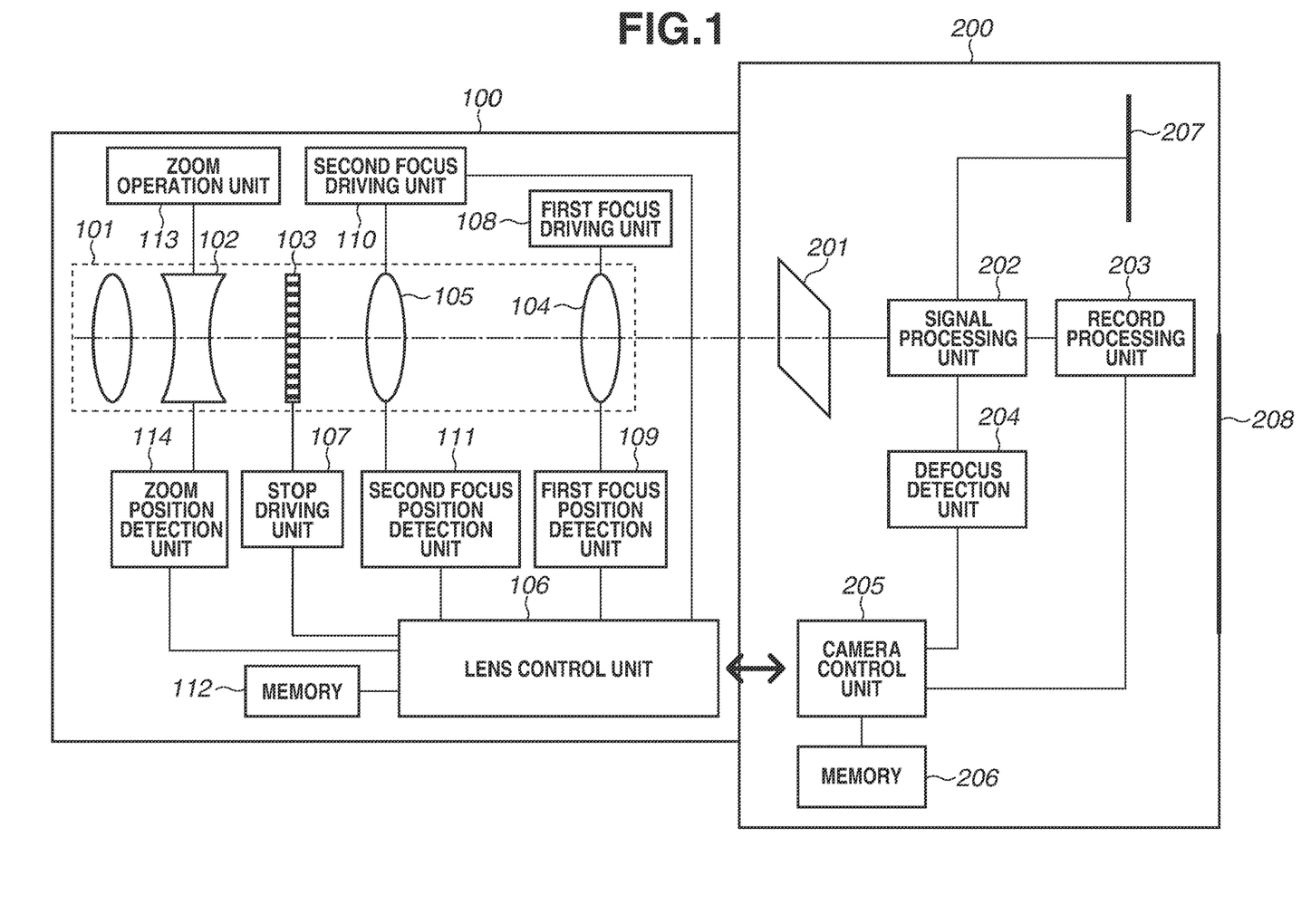
FIG. 1 is a schematic diagram illustrating a camera system according to a first exemplary embodiment.

FIG. 1 illustrates a configuration of a camera system 10 according to a first exemplary embodiment. The camera system 10 includes a lens apparatus 100 and a camera main body 200. The lens apparatus 100 and the camera main body 200 are mechanically and electrically connected via a mount (not illustrated), and power supply and mutual communication between the lens apparatus 100 and the camera main body 200 are performed via a terminal on the mount.

The lens apparatus 100 includes an optical system 101 that forms an optical image of an object on an image sensor 201 of the camera main body 200. In the optical system 101, a zoom lens unit 102, a stop 103, a first focus lens unit 104, and a second focus lens unit 105 are included. In other words, the optical system 101 is a zoom lens. The "lens unit" is a set of lenses that are integrally still or move in one of zooming and focusing, and includes one or more lenses.

The zoom lens unit 102 is driven in an optical axis direction by an operation of a zoom operation unit 113, so that the zoom lens unit 102 can change a focal length of the lens apparatus 100. The stop 103 includes stop blades (not illustrated) to be used to adjust the light quantity. A stop driving unit 107 moves the stop blades via an actuator to adjust the light quantity.

The first focus lens unit 104 is moved in the optical axis direction by a first focus driving unit 108 via an actuator, so that an in-focus state and an aberration are adjusted. Similarly, the second focus lens unit 105 is moved in the optical axis direction by a second focus driving unit 110 via an actuator, so that an in-focus state and an aberration are adjusted.

A first focus position detection unit 109 detects a position of the first focus lens unit 104, and transmits the detected position of the first focus lens unit 104 to a lens control unit 106. Similarly, a second focus position detection unit 111 detects a position of the second focus lens unit 105, and transmits the detected position of the second focus lens unit 105 to the lens control unit 106.

The lens control unit 106 functions as a control device, and is a computer including a central processing unit (CPU). The lens control unit 106 controls driving of the stop 103, the first focus lens unit 104, and the second focus lens unit 105 by transmitting respective drive command values to each of the stop driving unit 107, the first focus driving unit 108, and the second focus driving unit 110. In other words, the lens control unit 106 has a function as a control unit that controls each of the focus lens units. Details and a procedure of this control method will be described below.

Figure 3A:
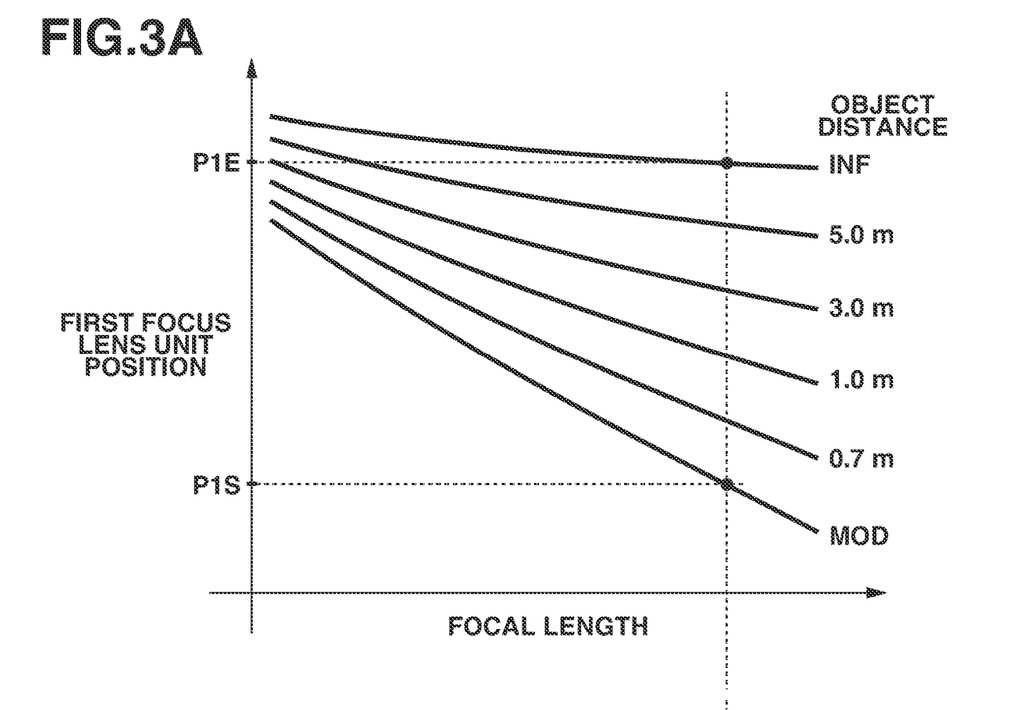
FIGS. 3A and 3B are graphs illustrating zoom-focus position data.
Figure 3B:
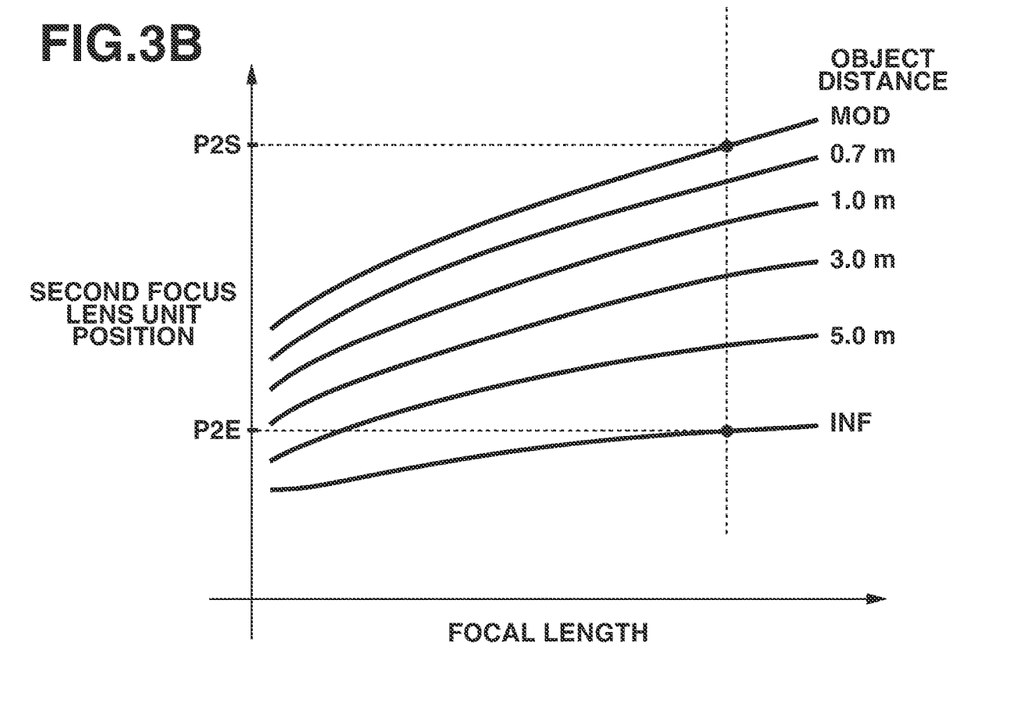

A memory 112 is a storage unit including a device such as a read only memory (ROM) or a random access memory (RAM). The memory 112 stores information necessary for driving of the stop 103, the first focus lens unit 104, and the second focus lens unit 105. The information stored in the memory 112 is represented by relationship information indicating a relationship among a focal length, an object distance and a position of the first focus lens unit 104 and a relationship among a focal length, an object distance and a position of the second focus lens unit 105, as illustrated in FIGS. 3A and 3B. This relationship information about the lens unit position corresponding to the focal length and the object distance will be hereinafter referred to as "zoom-focus position data". The lens control unit 106 has a function as an acquisition unit that acquires various kinds of information stored in the memory 112.

The zoom operation unit 113 corresponds to a mechanism for manually moving the zoom lens unit 102 such as a zoom ring, and a mechanism for electrically moving the zoom lens unit 102 using an actuator. A zoom position detection unit 114 detects a position of the zoom lens unit 102 and transmits the detected position of the zoom lens unit 102 to the lens control unit 106.

The camera main body 200 includes the image sensor 201, a signal processing unit 202, a record processing unit 203, a defocus detection unit 204, a camera control unit 205, a memory 206, an electronic view finder 207, and a display unit 208.

The image sensor 201 receives light from the optical system 101, generates an electrical signal by photoelectrically converting the received light, and transmits the electrical signal to the signal processing unit 202. The image sensor 201 includes a pixel for imaging and a pixel for in-focus position detection (not illustrated) as well. The signal processing unit 202 converts the electrical signal from the image sensor 201 into a digital signal.

The signal processing unit 202 performs various types of image processing such as noise removal and color correction on a digital signal, and transmits the resulting image data to the record processing unit 203. The record processing unit 203 displays the input image data on the electronic view finder 207 and the display unit 208.

The defocus detection unit 204 detects a phase difference between a pair of object-image signals obtained from light incident on the pixel for in-focus position detection of the image sensor 201, via a micro-lens that performs pupil division. The defocus detection unit 204 determines a defocus amount based on the detected phase difference, and outputs the determined defocus amount to the camera control unit 205.

The camera control unit 205 is an arithmetic unit including a CPU, and is electrically connected to the record processing unit 203, the defocus detection unit 204, and the memory 206. The camera control unit 205 reads out a program stored in the memory 206 and executes the read-out program, and also exchanges information necessary for automatic focus control with the lens control unit 106. Further, the camera control unit 205 controls the camera main body 200 based on inputs from camera operation portions such as an image-capturing switch and various setting switches (not illustrated).

Operation of the lens control unit 106 when a command for moving a focus lens is transmitted from the camera main body 200 to the lens apparatus 100 will be sequentially described.

Upon receiving a drive command from the camera main body 200, the lens control unit 106 calculates a driving amount for each of the first focus lens unit 104 and the second focus lens unit 105. FIG. 3A is a graph illustrating a relationship (the zoom-focus position data) among a focal length, an object distance and a position of the first focus lens unit 104, and FIG. 3B is a graph illustrating a relationship (the zoom-focus position data) among a focal length, an object distance and a position of the second focus lens unit 105. For example, suppose the lens control unit 106 receives a command for driving the focus lens unit currently at the closest position (minimum object distance (MOD)) to the infinity position (INF).

It is necessary to move the first focus lens unit 104 from a position P1S to a position P1E, and thus a driving amount can be calculated as follows.

$$P1E-P1S \qquad (1)$$

Similarly, a driving amount for the second focus lens unit 105 can be calculated as follows.

$$P2E-P2S \qquad (2)$$

The zoom-focus position data in FIGS. 3A and 3B is six kinds of data indicating that the object distances are MOD, 0.7 m, 1.0 m, 3.0 m, 5.0 m, and INF. The object distances are discrete because the zoom-focus position data is saved within a range of a limited amount of data that can be stored in the memory 112. Therefore, in a case where a command for movement from a position corresponding to 2.0 m to a position corresponding to 4.0 m is issued, the lens control unit 106 determines a lens unit position corresponding to 2.0 m by performing interpolation calculation based on data representing 1.0 m and 3.0 m in the zoom-focus position data. Similarly, the lens control unit 106 determines a lens unit position corresponding to 4.0 m by performing interpolation calculation based on data representing 3.0 m and 5.0 m. The driving amount for each of the first focus lens unit 104 and the second focus lens unit 105 can be thus calculated. The focal length is illustrated as if the focal length is continuous data. However, because the amount of data that can be stored in the memory 112 is limited, the focal length is also saved as a finite number of discrete data. In terms of the focal length as well, a lens unit position based on a corresponding focal length can also be calculated by interpolation calculation using adjacent data, as with the relationship between the object distance and the lens unit position.

How to determine a driving velocity for each of the focus lens units will be described. In the present exemplary embodiment, the camera main body 200 designates only a velocity V1 for the first focus lens unit 104 at the time of transmitting the drive command. This is to perform uniform control processing in the camera main body 200 irrespective of the number of focus lens units in the lens apparatus, because a lens apparatus including only one focus lens unit can be attached to the camera main body 200.

A velocity V2 for the second focus lens unit 105 is provisionally set based on the ratio between the driving amount for the first focus lens unit 104 and the driving amount for the second focus lens unit 105. Specifically, the velocity V2 is calculated using the following equation (3).

$$V2=(P2E-P2S)/(P1E-P1S) \times V1 \quad (3)$$

Figure 2:
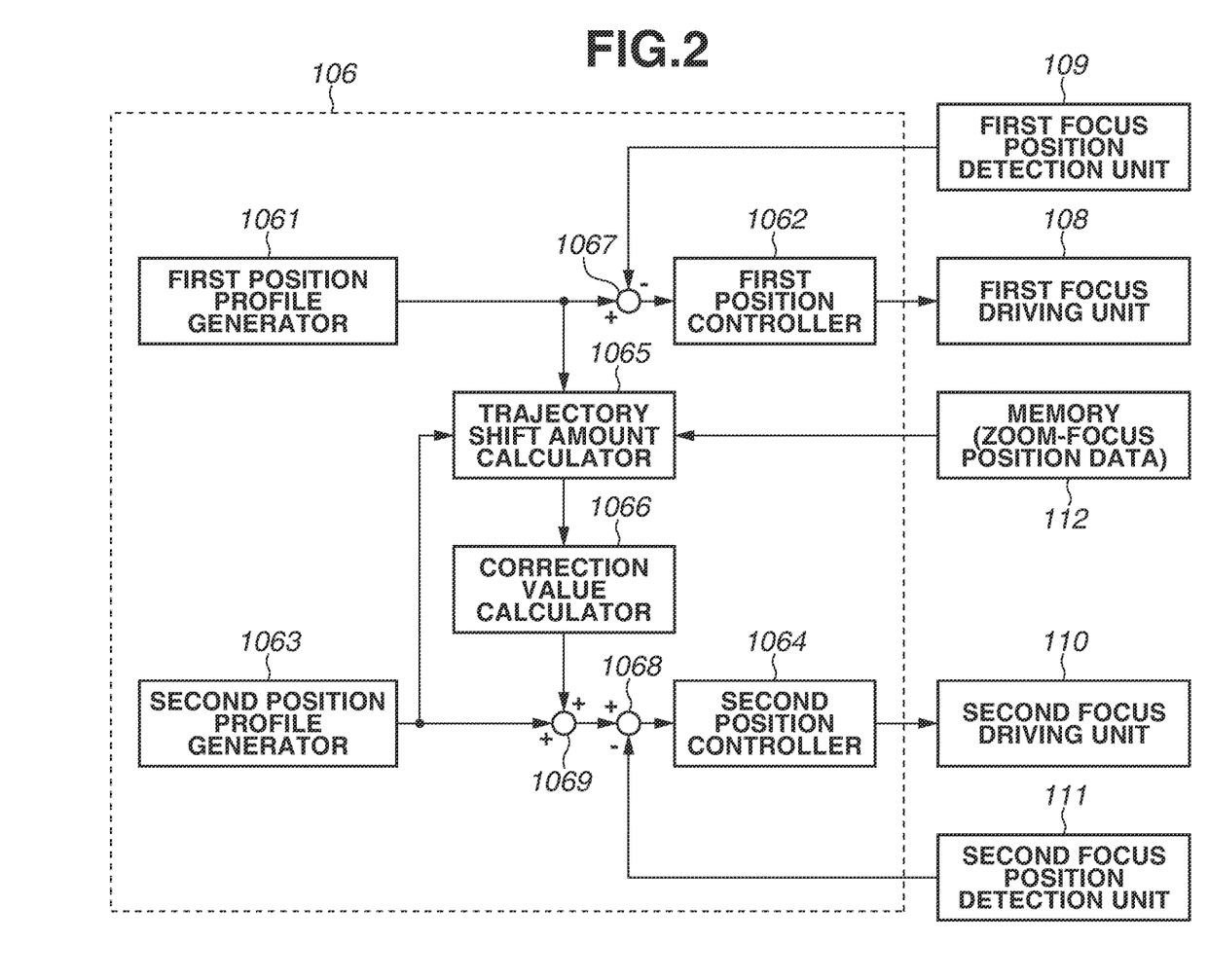
FIG. 2 is a block diagram illustrating a configuration of a lens control unit according to the first exemplary embodiment.
Figure 4:
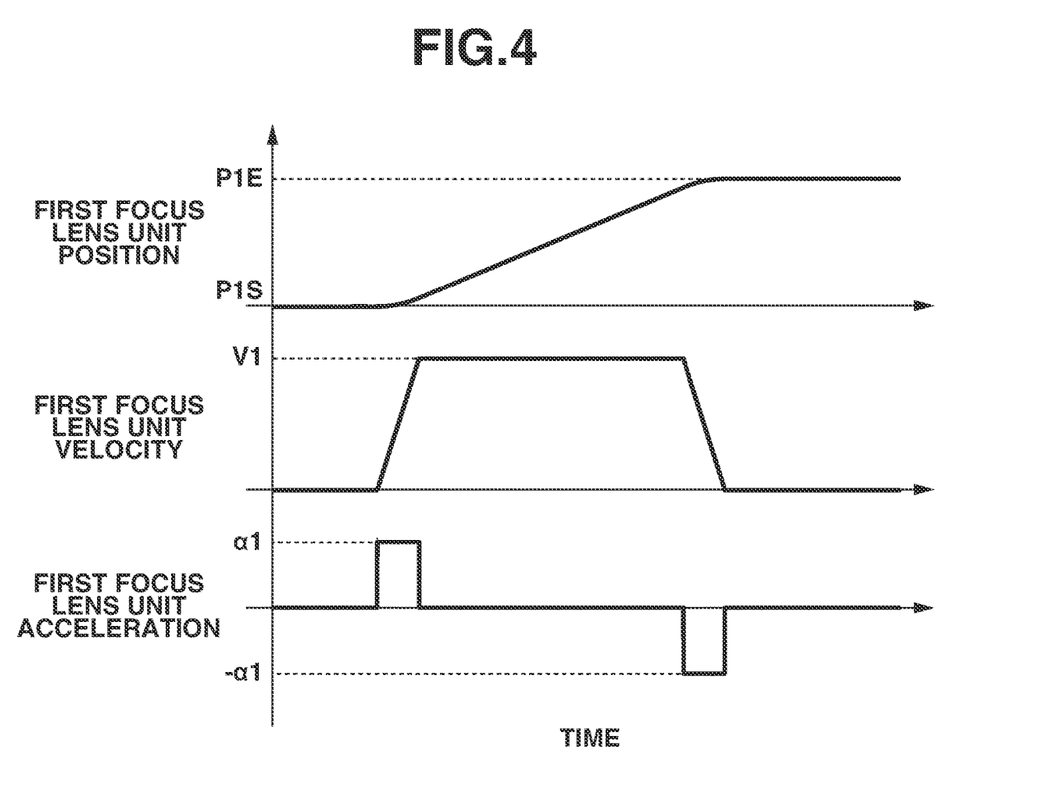
FIG. 4 illustrates an example of a target position profile of a first focus lens unit.
Figure 5:
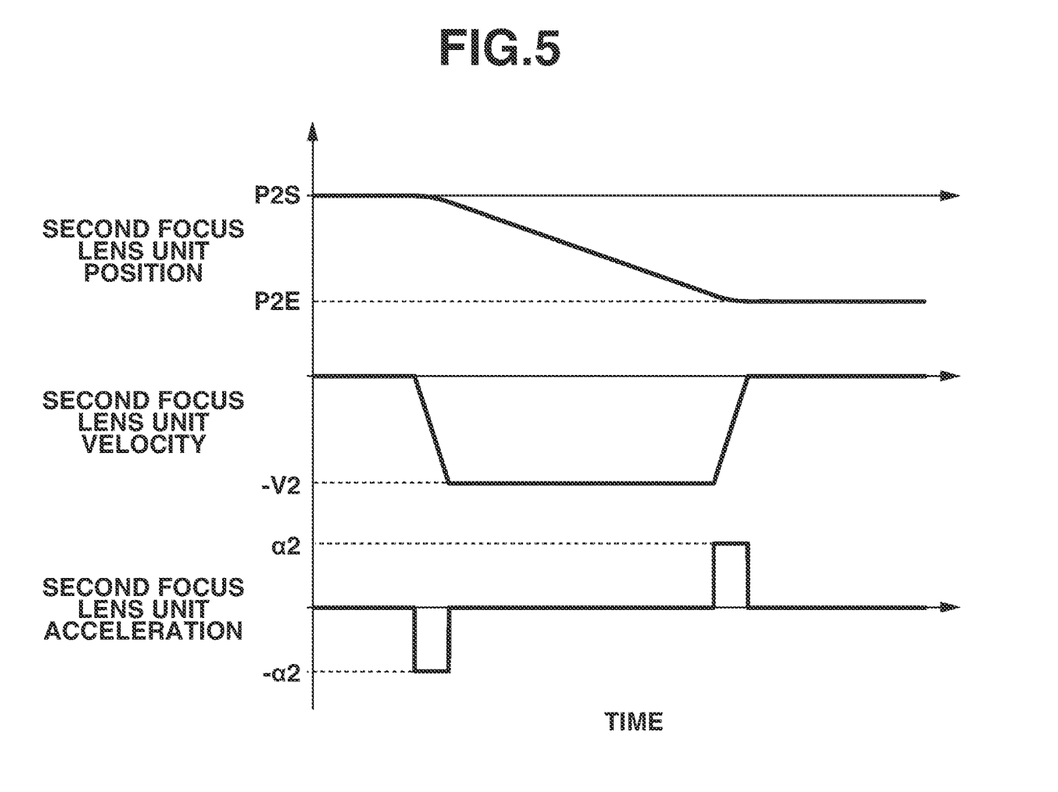
FIG. 5 illustrates an example of a target position profile of a second focus lens unit.

FIG. 2 is a block diagram illustrating a detailed configuration of the lens control unit 106 according to the present exemplary embodiment. In a case where the driving amount and the velocity for the first focus lens unit 104 and those of the second focus lens unit 105 are determined, the former driving amount and velocity are set in a first position profile generator 1061 and the latter driving amount and velocity are set in a second position profile generator 1063. The first position profile generator 1061 generates a profile of a target position for accelerating the first focus lens unit 104 at a predetermined acceleration a1 illustrated in FIG. 4 up to the velocity V1, subsequently moving the first focus lens unit 104 at a constant velocity that is the velocity V1, and then slowing the first focus lens unit 104 down, and eventually stopping the first focus lens unit 104 at the position P1E. Similarly, the second position profile generator 1063 generates a profile of a target position for accelerating the second focus lens unit 105 at a predetermined acceleration −α2 illustrated in FIG. 5 up to the velocity −V2, subsequently moving the second focus lens unit 105 at a constant velocity that is the velocity −V2, and then slowing the second focus lens unit 105 down, and eventually stopping the second focus lens unit 105 at the position P2E. Here, the combination of the constant acceleration drive and the constant velocity drive is used to simplify the description, but any kind of technique can be used for the method of deriving the position profile to be used for driving. The target position profile generated by the first position profile generator 1061 is transmitted to a first subtractor 1067 for every position control period. The target position profile is a profile formed of a temporal collection of target positions within each position control period, and can be a profile representing a temporal change in the target position.

The first subtractor 1067 calculates the difference between the actual position of the first focus lens unit 104 received from the first focus position detection unit 109 and the target position (the target position within the position control period) received from the first position profile generator 1061. The first subtractor 1067 transmits the calculated difference to a first position controller 1062, as a position deviation. The first position controller 1062 is a position controller that performs control calculation such as proportional-integral-derivative (PID) control, and outputs, to the first focus driving unit 108, an operation amount for causing the first focus lens unit 104 to follow the target position based on the position deviation received from the first subtractor 1067. The above-described calculation is repeated for every position control period, so that the first focus lens unit 104 moves from the position P1S to the position HE (the final target position), based on the target position from the first position profile generator 1061.

A trajectory shift amount calculator 1065 receives the target position of the first focus lens unit 104 from the first position profile generator 1061 and the target position of the second focus lens unit 105 from the second position profile generator 1063, and calculates a trajectory shift amount based on the zoom-focus position data recorded in the memory 112. In the present exemplary embodiment, a calculation period for the trajectory shift amount is the same as the position control period. The trajectory shift amount calculator 1065 calculates an object distance using the target position of the first focus lens unit 104 received from the first position profile generator 1061 and the zoom-focus position data in FIG. 3A. Since the zoom-focus position data in FIG. 3A is discrete data, the object distance corresponding to the target position of the first focus lens unit 104 can be determined by performing the interpolation calculation on adjacent data.

Based on the relationship between the object distance thus obtained and the zoom-focus position data in FIG. 3B, an ideal position of the second focus lens unit 105 (an ideal position of the second focus lens unit 105 corresponding to the position of the first focus lens unit 104) can be determined. The thus-calculated position of the second focus lens unit 105 is defined as the "ideal position", because disposing the lens units based on the zoom-focus position data as shown in FIGS. 3A and 3B is optically ideal.

Being optically ideal can also be expressed as a state where optical performance as designed can be achieved. In a case where a plurality of focus lens units is present, aberration of an optical system may change depending on the positional relationship therebetween. Therefore, it is important to drive the plurality of focus lens units while maintaining the positional relationship between the focus lens units in accordance with designed values.

Figure 6:
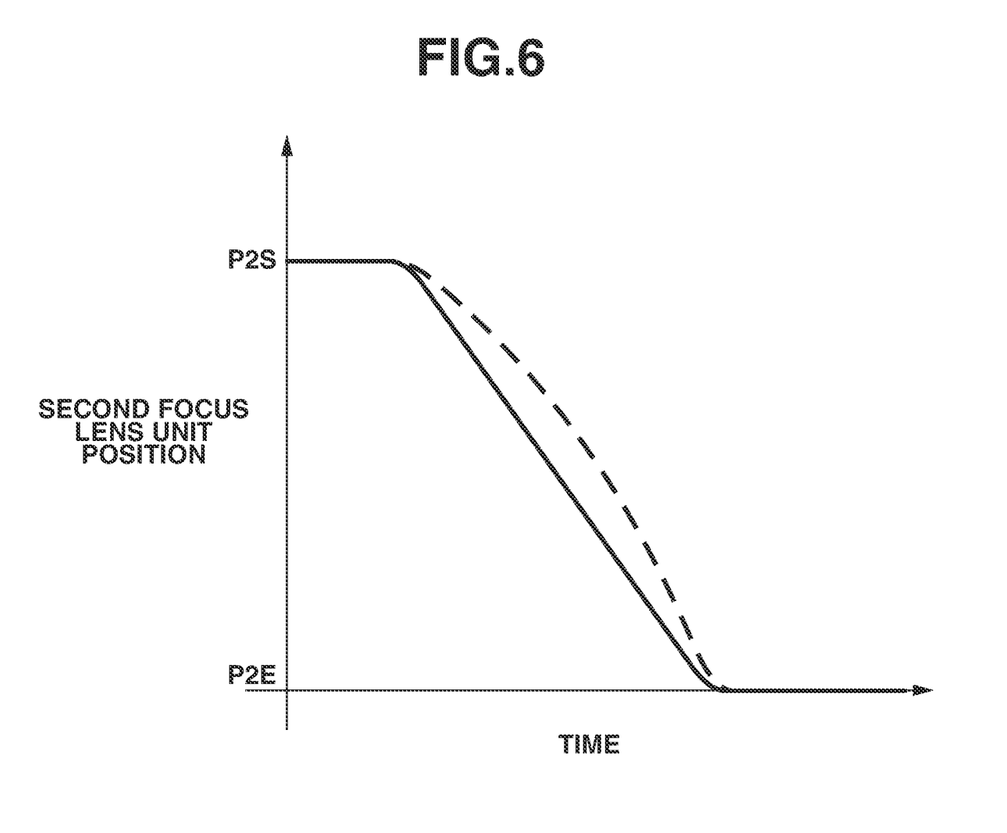
FIG. 6 is a graph illustrating a target position and an ideal position of the second focus lens unit.

FIG. 6 illustrates a profile (a solid line) of the target position of the second focus lens unit 105 generated by the second position profile generator 1063 and a profile (a broken line) of the ideal position of the second focus lens unit 105 calculated by the trajectory shift amount calculator 1065. In the present exemplary embodiment, the velocity V2 for the second focus lens unit 105 is provisionally set based on the ratio between the driving amount for the first focus lens unit 104 and the driving amount for the second focus lens unit 105, and the target position of the second focus lens unit 105 is thereby set. Therefore, the time to reach the position P2E (the final target position) from the target position and the time to arrive at the position P2E from the ideal position are the same. However, there is a difference between the respective profiles due to a difference between the first focus lens unit 104 and the second focus lens unit 105 in terms of curvature in the zoom-focus position data. A broken line in FIG. 7 indicates a profile of a shift amount between the target position and the ideal position of the second focus lens unit 105. The trajectory shift amount calculator 1065 calculates such a shift amount for every calculation period (the same as the position control period in the present exemplary embodiment), and outputs the calculated shift amount to a correction value calculator 1066.

Figure 8:
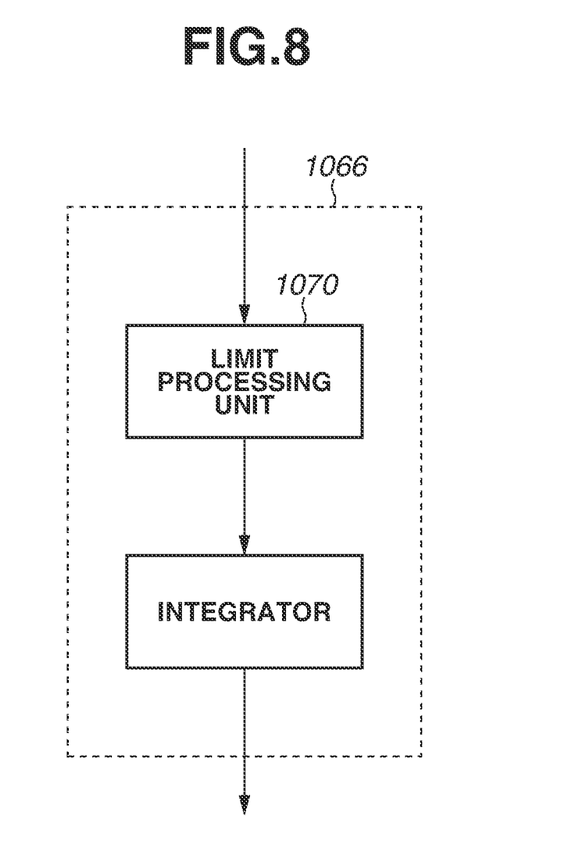
FIG. 8 is a block diagram illustrating a correction value calculator according to the first exemplary embodiment.

The correction value calculator 1066 calculates a correction value for correcting the target position of the second focus lens unit 105, based on the received shift amount. FIG. 8 is a block diagram illustrating the correction value calculator 1066. A limit processing unit 1070 performs limit processing on the shift amount received from the trajectory shift amount calculator 1065. In a case where the shift amount calculated by the trajectory shift amount calculator 1065 is excessive, the target position of the second focus lens unit 105 can be corrected to a large extent. Therefore, the limit processing unit 1070 sets a limit (an upper limit) on the correction value to prevent the correction amount for the shift amount from exceeding the output limit of the actuator of the second focus driving unit 110, and prevent driving noise from becoming large because of a steep correction value. For example, the limit can be set in a case where the shift amount is greater than a predetermined value.

The correction amount, on which the limit processing is performed, is processed by an integrator to be output as a correction value. An adder 1069 adds the output correction value to the target position of the second focus lens unit 105 output by the second position profile generator 1063. The signal resulting from the addition is sent to a second subtractor 1068 as a corrected target position of the second focus lens unit 105. The second subtractor 1068 determines a difference from the actual position of the second focus lens unit 105 obtained from the second focus position detection unit 111, and transmits the determined deference to a second position controller 1064 as a position deviation of the second focus lens unit 105. The second position controller 1064 is a controller such as a PID controller as with the first position controller 1062, and outputs, to the second focus driving unit 110, an operation amount for moving the second focus lens unit 105 to the target position.

Figure 7:
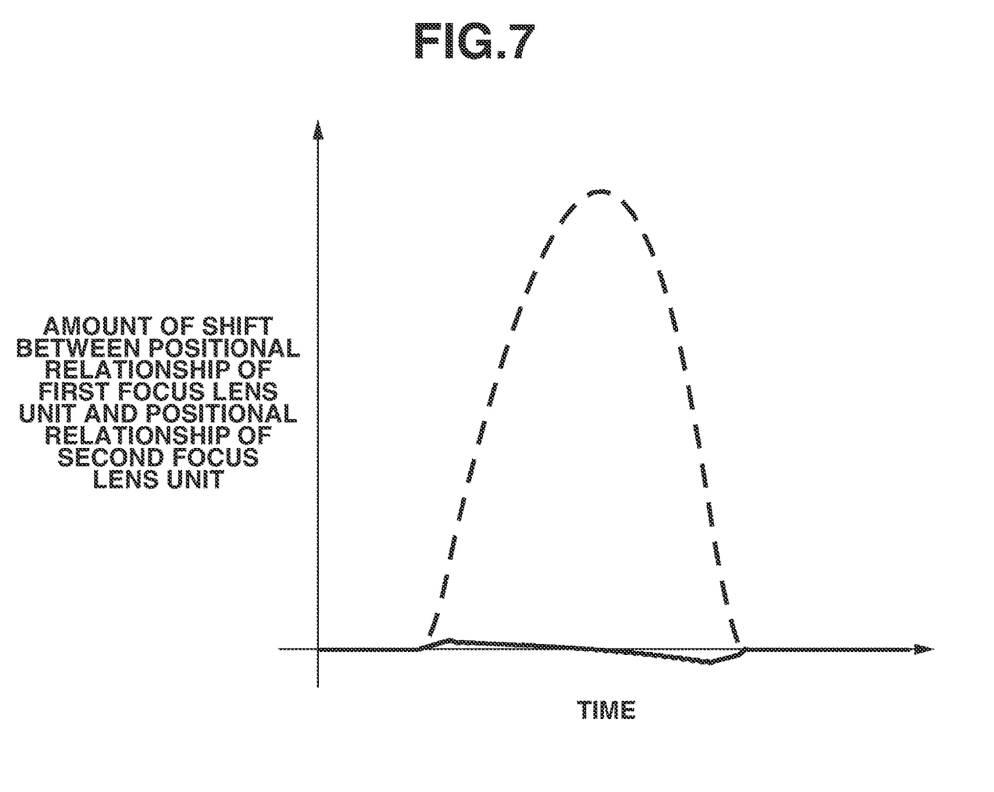
FIG. 7 is a graph illustrating a shift between the target position and the ideal position of the second focus lens unit.

A solid line in FIG. 7 indicates a profile of a shift amount between the target position corrected by the correction value calculator 1066 and the ideal position calculated by the trajectory shift amount calculator 1065, when the second focus lens unit 105 is moved from the position P2S to the position P2E. As indicated by the solid line, using the correction value reduces the shift between the positional relationship of the first focus lens unit 104 and the positional relationship of the second focus lens unit 105.

The control method for the second focus lens unit 105 in the present exemplary embodiment will be described with reference to a flowchart in FIG. 9. The flowchart in FIG. 9 starts when a drive command for driving the second focus lens unit 105 to the position P2E is issued. The lens control unit 106 in the lens apparatus 100 performs the control method represented by the flowchart in FIG. 9. The present exemplary embodiment can also be implemented as a program that causes a computer to execute steps in the flowchart.

In step S901, the trajectory shift amount calculator 1065 acquires a position of the first focus lens unit 104. The position of the first focus lens unit 104 to be acquired in step S901 in the present exemplary embodiment is a target position of the first focus lens unit 104 generated by the first position profile generator 1061. The position of the first focus lens unit 104 to be acquired in step S901 is not limited to this position as will be described below with reference to modifications. The current position (the actual position) of the first focus lens unit 104 can be used as the position of the first focus lens unit 104.

In step S902, the trajectory shift amount calculator 1065 acquires information about a current zoom position from the zoom position detection unit 114. In a case where the optical system 101 is not the zoom lens but a fixed focal length lens, this step can be omitted.

In step S903, the trajectory shift amount calculator 1065 calculates an ideal position of the second focus lens unit 105. The ideal position of the second focus lens unit 105 is the position described above. In other words, the trajectory shift amount calculator 1065 calculates an object distance for the first focus lens unit 104 based on the position (the target position in the present embodiment) of the first focus lens unit 104 and the zoom-focus position data of the first focus lens unit 104. Subsequently, the trajectory shift amount calculator 1065 calculates an ideal position of the second focus lens unit 105 corresponding to the position (the target position in the present embodiment) of the first focus lens unit 104, based on the object distance and the zoom-focus position data of the second focus lens unit 105.

In step S904, the trajectory shift amount calculator 1065 calculates a shift amount of the second focus lens unit 105. In other words, the trajectory shift amount calculator 1065 calculates a difference between the target position of the second focus lens unit 105 generated by the second position profile generator 1063 and the ideal position of the second focus lens unit 105 calculated in step S903, as the shift amount.

In step S905, the correction value calculator 1066 converts the shift amount into the correction value (i.e., calculates the correction value).

In step S906, the adder 1069 adds the correction value calculated by the correction value calculator 1066 to the target position of the second focus lens unit 105 generated by the second position profile generator 1063, and thereby calculating a corrected target position of the second focus lens unit 105. The drive control for the second focus lens unit 105 is performed based on this corrected target position.

In step S907, the lens control unit 106 determines whether the second focus lens unit 105 has reached the position P2E (the final target position). In a case where the second focus lens unit 105 has reached the position P2E (YES in step S907), the processing ends. In a case where the second focus lens unit 105 has not reached the position P2E (NO in step S907), the processing returns to step S901.

In the present exemplary embodiment, the first focus lens unit 104 is driven based on the output of the first position profile generator 1061, and the zoom-focus position data is used for the drive control for the second focus lens unit 105. Therefore, in comparison with a case where minute control is performed using the zoom-focus position data for both of the first focus lens unit 104 and the second focus lens unit 105, a calculation amount can be reduced, so that the plurality of focus lens units can be smoothly driven at high speed. In other words, the above-described processing can improve the controllability of the plurality of focus lens units.

In the present exemplary embodiment, the position (the target position) of the first focus lens unit 104 is used to calculate the ideal position of the second focus lens unit 105. In this calculation, it is desirable that focus sensitivity (an image plane movement amount per moving amount of the focus lens unit) of the first focus lens unit 104 be higher than that of the second focus lens unit 105. This means that the first focus lens unit 104 performs main focusing. The correction processing for the target value in the present exemplary embodiment is performed on the focus lens unit having relatively low focus sensitivity, so that smoother focus control can be performed.

A first modification of the above-described first exemplary embodiment will be described.

Figure 10:
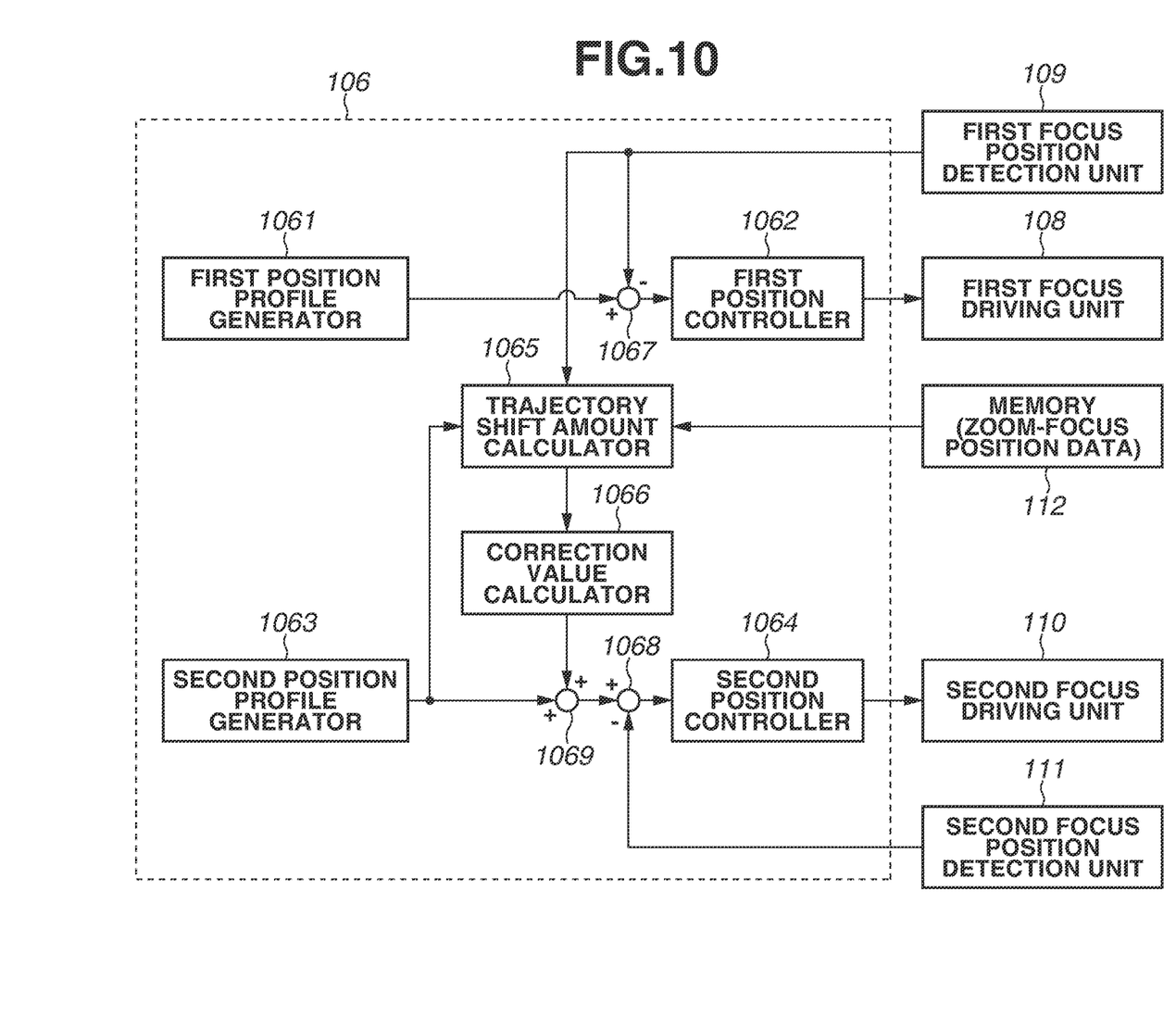
FIG. 10 is a block diagram illustrating a configuration of a lens control unit according to a first modification.

FIG. 10 illustrates a configuration of the lens control unit 106 according to the present modification.

The present modification is different from the first exemplary embodiment in that the position information of the first focus lens unit 104 to be input to the trajectory shift amount calculator 1065 is not the target position generated by the first position profile generator 1061, but the actual position of the first focus lens unit 104. In other words, the position of the first focus lens unit 104 detected by the first focus position detection unit 109 is input to the trajectory shift amount calculator 1065. Subsequent processing stages are similar to those of the first exemplary embodiment.

The target position of the second focus lens unit 105 is corrected based on the actual position of the first focus lens unit 104, so that it is possible to perform driving while maintaining a state where the shift between the positional relationship of the first focus lens unit 104 and the positional relationship of the second focus lens unit 105 is smaller than in the first exemplary embodiment.

However, in a case where the frequency characteristic of the position control system of the first focus lens unit 104 and the frequency characteristic of the position control system of the second focus lens unit 105 are close, the respective control systems may interfere with each other. In such a case, it is desirable to calculate a shift amount using the target position of the first focus lens unit 104 as with the first exemplary embodiment.

In the first exemplary embodiment, the calculation period of the trajectory shift amount calculator 1065 is described to be the same as the position control period of each of the first focus lens unit 104 and the second focus lens unit 105. However, in a case where the correction amount of the second focus lens unit 105 is calculated by performing interpolation processing on the zoom-focus position data as performed in the trajectory shift amount calculator 1065, the time required for the calculation of the shift amount can be longer than the position control period.

A second modification will be described regarding a case where the calculation period for the shift amount is longer than the position control period.

Figure 11:
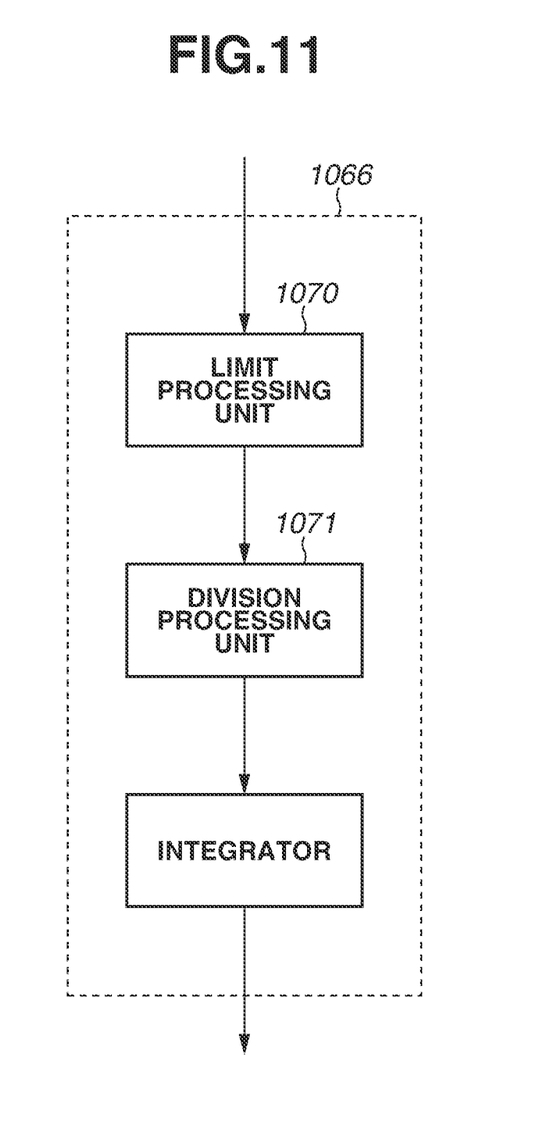
FIG. 11 is a block diagram illustrating a correction value calculator according to a second modification.

FIG. 11 is a block diagram illustrating the correction value calculator 1066 according to the present modification. A point different form the first exemplary embodiment is that a division processing unit 1071 is added to an output stage of the limit processing unit 1070. The division processing unit 1071 converts the shift amount calculated by the trajectory shift amount calculator 1065 into a correction amount per clock of the position control calculation. For example, in a case where the calculation period for the shift amount is ten times the position control period, the division processing unit 1071 divides the shift amount into ten, so that it is possible to add a correction value to the target position of the second focus lens unit 105 while gradually changing the correction value.

In a case where the shift amount calculated by the trajectory shift amount calculator 1065 is sufficiently small, the division processing can be omitted. The division processing can be appropriately set depending on noise due to the characteristic or a fast movement of an actuator. Such a configuration can separate the position control period from the trajectory shift amount calculator 1065 that takes a long time to calculate while referring to the zoom-focus position data, so that the target position to be used for the position control can be calculated with a high-speed calculation period.

Figure 9:
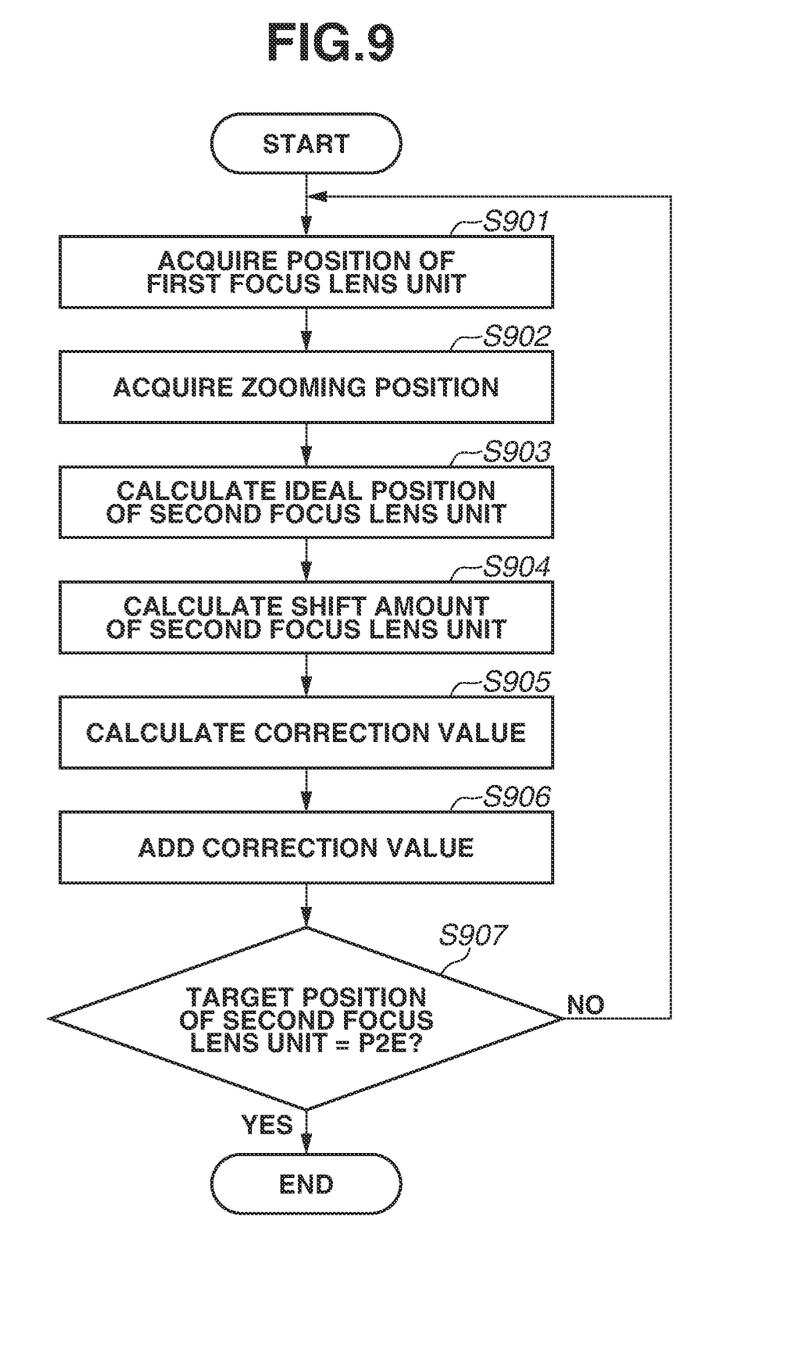
FIG. 9 is a flowchart illustrating control of the second focus lens unit according to the first exemplary embodiment.

If the calculation period for the shift amount is ten times the position control period, step S901 to step S904 of the flowchart illustrated in FIG. 9 in the present modification are performed once for every ten times other steps are performed, and the shift amount is thereby updated. Then, in step S905, the correction value resulting from the division by the division processing unit 1071 is calculated.

The exemplary embodiments of the disclosure have been described above, but the disclosure is not limited to these exemplary embodiments, and various combinations, alterations, and modifications can be made without departing from the scope of the disclosure.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-192822, filed Oct. 23, 2019, which is hereby incorporated by reference herein in its entirety.

What is claimed is:

1. A control device that controls a lens apparatus including a first focus lens unit and a second focus lens unit that move in trajectories different from each other in focusing, the control device comprising:
   a generation unit configured to generate a second target position profile indicating a target position of the second focus lens unit in driving the second focus lens unit;
   an acquisition unit configured to acquire relationship information indicating relationships between respective positions of the first focus lens unit and the second focus lens unit and an object distance;
   a calculation unit configured to calculate a shift between an ideal position of the second focus lens unit and a position of the second focus lens unit in the second target position profile, the ideal position being calculated while the second focus lens unit is driven for focusing using the relationship information and corresponding to a position of the first focus lens unit;
   a correction unit configured to correct the target position of the second focus lens unit based on the shift; and
   a control unit configured to control the position of the second focus lens unit depending on the target position corrected by the correction unit,
   wherein the control unit controls the position of the second focus lens unit with a first period,
   wherein the calculation unit calculates the shift with a second period, and
   wherein the second period is longer than the first period.

2. The control device according to claim 1, wherein the generation unit generates the second target position profile based on a driving amount and a velocity of the first focus lens unit.

3. The control device according to claim 1,
   wherein the generation unit further generates a first target position profile indicating a target position of the first focus lens unit in driving the first focus lens unit, and
   wherein the calculation unit calculates the ideal position based on the first target position profile.

4. The control device according to claim 3, wherein the calculation unit calculates a position of the second focus lens unit corresponding to the target position of the first focus lens unit, as the ideal position.

5. The control device according to claim 1, further comprising a position detection unit that detects a position of the first focus lens unit,
   wherein the calculation unit calculates the ideal position based on the position of the first focus lens unit detected by the position detection unit.

6. The control device according to claim 5, wherein the calculation unit calculates a position of the second focus lens unit corresponding to the position of the first focus lens unit detected by the position detection unit, as the ideal position.

7. The control device according to claim 1, wherein the correction unit divides a correction amount of the target position based on the shift to correct the target position with the first period.

8. The control device according to claim 1, wherein, in a case where the shift is greater than a predetermined value, the correction unit sets a limit on a correction amount of the target position based on the shift.

9. The control device according to claim 1, wherein focus sensitivity of the first focus lens unit is higher than focus sensitivity of the second focus lens unit.

10. A lens apparatus comprising:
    a first focus lens unit;
    a second focus lens unit; and
    a controller,
    wherein the controller includes
    a generation unit configured to generate a second target position profile indicating a target position of the second focus lens unit in driving the second focus lens unit,
    an acquisition unit configured to acquire relationship information indicating relationships between respective positions of the first focus lens unit and the second focus lens unit and an object distance,
    a calculation unit configured to calculate a shift between an ideal position of the second focus lens unit and a position of the second focus lens unit in the second target position profile, the ideal position being calculated while the second focus lens unit is driven for focusing using the relationship information and corresponding to the position of the first focus lens unit,
    a correction unit configured to correct the target position of the second focus lens unit based on the shift, and
    a control unit configured to control the position of the second focus lens unit depending on the target position corrected by the correction unit,
    wherein the control unit controls the position of the second focus lens unit with a first period,
    wherein the calculation unit calculates the shift with a second period, and
    wherein the second period is longer than the first period.

11. The lens apparatus according to claim 10, wherein the generation unit generates the second target position profile based on a driving amount and a velocity of the first focus lens unit.

12. The lens apparatus according to claim 10,
    wherein the generation unit further generates a first target position profile indicating a target position of the first focus lens unit in driving the first focus lens unit, and
    wherein the calculation unit calculates the ideal position based on the first target position profile.

13. The lens apparatus according to claim 10, wherein the controller further includes a position detection unit that detects a position of the first focus lens unit,
    wherein the calculation unit calculates the ideal position based on the position of the first focus lens unit detected by the position detection unit.

14. An imaging apparatus comprising:
    an image sensor; and
    a controller that controls an optical system including a first focus lens unit and a second focus lens unit that move in trajectories different from each other in focusing,
    wherein the controller includes
    a generation unit configured to generate a second target position profile indicating a target position of the second focus lens unit in driving the second focus lens unit,
    an acquisition unit configured to acquire relationship information indicating relationships between respective positions of the first focus lens unit and the second focus lens unit and an object distance,
    a calculation unit configured to calculate a shift between an ideal position of the second focus lens unit and a position of the second focus lens unit in the second target position profile, the ideal position being calculated while the second focus lens unit is driven for focusing using the relationship information and corresponding to the position of the first focus lens unit, a correction unit configured to correct the target position of the second focus lens unit based on the shift, and a control unit configured to control the position of the second focus lens unit depending on the target position corrected by the correction unit, wherein the control unit controls the position of the second focus lens unit with a first period, wherein the calculation unit calculates the shift with a second period, and wherein the second period is longer than the first period.

15. The imaging apparatus according to claim 14, wherein the generation unit generates the second target position profile based on a driving amount and a velocity of the first focus lens unit.

16. The imaging apparatus according to claim 14, wherein the generation unit further generates a first target position profile indicating a target position of the first focus lens unit in driving the first focus lens unit, and wherein the calculation unit calculates the ideal position based on the first target position profile.

17. The imaging apparatus according to claim 14, wherein the controller further includes a position detection unit that detects a position of the first focus lens unit, wherein the calculation unit calculates the ideal position based on the position of the first focus lens unit detected by the position detection unit.

* * * * *